(12) United States Patent
Sebastian et al.

(10) Patent No.: US 10,384,862 B2
(45) Date of Patent: Aug. 20, 2019

(54) MOISTURE BARRIER COATED TOBACCO PRODUCT PACKAGING

(71) Applicant: R.J. Reynolds Tobacco Company, Winston-Salem, NC (US)

(72) Inventors: Andries D. Sebastian, Clemmons, NC (US); Craig T. Demarest, Oak Ridge, NC (US); Percy D. Phillips, Pfafftown, NC (US); Michael F. Davis, Winston-Salem, NC (US); Pankaj C. Patel, Clemmons, NC (US)

(73) Assignee: R.J. REYNOLDS TOBACCO COMPANY, Winston-Salem, NC (US)

( * ) Notice: Subject to any disclaimer, the term of this patent is extended or adjusted under 35 U.S.C. 154(b) by 878 days.

(21) Appl. No.: 14/808,139

(22) Filed: Jul. 24, 2015

(65) Prior Publication Data

US 2017/0021994 A1    Jan. 26, 2017

(51) Int. Cl.
*B65D 85/10*     (2006.01)
*B65D 5/62*      (2006.01)
*A24F 15/12*     (2006.01)
*C09D 167/04*    (2006.01)
*C09D 103/02*    (2006.01)
*D21H 27/10*     (2006.01)
*D21H 19/82*     (2006.01)

(52) U.S. Cl.
CPC .......... *B65D 85/1036* (2013.01); *A24F 15/12* (2013.01); *B65D 5/62* (2013.01); *B65D 85/1045* (2013.01); *C09D 103/02* (2013.01); *C09D 167/04* (2013.01); *D21H 19/82* (2013.01); *D21H 19/822* (2013.01); *D21H 27/10* (2013.01)

(58) Field of Classification Search
CPC ..................................................... B32B 27/10
See application file for complete search history.

(56) References Cited

U.S. PATENT DOCUMENTS

| 3,695,422 A | 10/1972 | Tripodi |
| 3,874,581 A | 4/1975 | Fox et al. |
| 3,944,066 A | 3/1976 | Niepmann |
| 4,387,126 A | 6/1983 | Rebholz |

(Continued)

FOREIGN PATENT DOCUMENTS

| EP | 0 392 737 | 10/1990 |
| IN | IN-MUM2011/01441 | 6/2012 |

(Continued)

OTHER PUBLICATIONS

International Search Report and Written Opinion issued in PCT/US2016/042540, dated Oct. 7, 2016.

(Continued)

*Primary Examiner* — Rachel Kahn
(74) *Attorney, Agent, or Firm* — Foley & Lardner LLP

(57) ABSTRACT

Provided herein is a cigarette pack formed of a moisture barrier coated paper material. The paper material includes a base substrate, a first polymer coating, a second polymer coating, and a third polymer coating. The first polymer coating, the second polymer coating, and the third polymer coating provide a barrier for moisture and air exchange through the paper material. The first polymer coating, the second polymer coating, and the third polymer coating also provide heat and pressure sealability capabilities to the paper material.

22 Claims, 5 Drawing Sheets

(56) References Cited

U.S. PATENT DOCUMENTS

| | | |
|---|---|---|
| 4,717,017 A | 1/1988 | Sprinkel et al. |
| 4,807,745 A | 2/1989 | Langley et al. |
| 4,852,734 A | 8/1989 | Allen et al. |
| 5,139,140 A | 8/1992 | Burrows et al. |
| 5,248,031 A | 9/1993 | Burrows et al. |
| 5,333,729 A | 8/1994 | Wolfe |
| 5,379,889 A | 1/1995 | Cobler |
| 5,427,235 A | 6/1995 | Powell et al. |
| 6,364,106 B1 | 4/2002 | Fagg et al. |
| 6,595,353 B1 * | 7/2003 | Focke ............... B65D 85/1018 206/245 |
| 7,014,039 B2 | 3/2006 | Henson et al. |
| 7,048,115 B2 | 5/2006 | Stringfield |
| 7,228,961 B2 | 6/2007 | Koetter et al. |
| 7,823,731 B2 | 11/2010 | Wu |
| 8,118,161 B2 | 2/2012 | Guerrera et al. |
| 8,522,515 B2 | 9/2013 | Carter et al. |
| 2008/0230410 A1 | 9/2008 | Jones et al. |
| 2012/0205065 A1 | 8/2012 | Esser |
| 2013/0292279 A1 | 11/2013 | Bengtsson et al. |
| 2014/0272163 A1 * | 9/2014 | Tilton ................ D21H 5/12 427/427.4 |
| 2014/0274633 A1 | 9/2014 | Tilton |

FOREIGN PATENT DOCUMENTS

| | | | |
|---|---|---|---|
| WO | WO-2009/112255 A1 | 9/2009 | |
| WO | WO-2009106493 A1 * | 9/2009 | ............. A24F 25/02 |
| WO | WO-2014/071377 | 5/2014 | |
| WO | WO-2016/170229 A1 | 10/2016 | |

OTHER PUBLICATIONS

Extended European Search Report in EP 16831042.3, dated Feb. 15, 2019, 8 pages.

* cited by examiner

MOISTURE BARRIER COATED TOBACCO PRODUCT PACKAGING

FIELD OF THE DISCLOSURE

The present disclosure relates to a moisture barrier coated packaging.

DISCLOSURE OF RELATED ART

Cigarettes conventionally have been sold in packages, with each package often containing twenty (20) cigarettes. Typical cigarette packages have a generally rectangular parallelepiped form. One type of popular cigarette package employs a container having the form of a so-called "hard pack," "crush proof box" or "hinged lid package." See, for example, U.S. Pat. No. 3,874,581 to Fox et al.; U.S. Pat. No. 3,944,066 to Niepmann; U.S. Pat. No. 4,852,734 to Allen et al.; European Pat. 0392737 to Moeller; and U.S. Pub. Pat. App. No. 2008/0230410 to Jones et al., each of which is incorporated herein by reference. Another type of popular cigarette package employs a container having the form of the so-called "soft pack." See, for example, U.S. Pat. No. 3,695,422 to Tripodi; U.S. Pat. No. 4,717,017 to Sprinkel et al.; and U.S. Pat. No. 5,333,729 to Wolfe, each of which is incorporated herein by reference. Both types of cigarette packages are normally packed in cartons also of generally rectangular parallelepiped form, typically ten (10) packages to a carton.

Additional examples of cigarette packages can be found in U.S. Pat. No. 8,522,515 to Carter et al.; U.S. Pat. No. 8,118,161 to Guerrera et al.; U.S. Pat. No. 7,823,731 to Wu; U.S. Pat. No. 7,228,961 to Koetter et al.; U.S. Pat. No. 7,048,115 to Stringfield; U.S. Pat. No. 7,014,039 to Henson et al.; U.S. Pat. No. 6,364,106 to Fagg et al.; U.S. Pat. No. 5,379,889 to Cobler et al.; U.S. Pat. No. 5,248,031 to Burrows et al.; U.S. Pat. No. 5,139,140 to Burrows et al.; and U.S. Pat. No. 4,807,745 to Langley et al., each of which is incorporated herein by reference.

The above-identified cigarette packages are typically formed from folded and glued paper material. The paper material provides the structural rigidity for the cigarette packages. However, paper board in it of itself does not provide the necessary moisture retention properties for proper storage of tobacco products. Accordingly, almost all commercial cigarette packages are enclosed within a plastic film that prevents moisture loss from within the pack to the outside. However, these plastic films have various drawbacks. The plastic films are not biodegradable and contribute significantly towards packaging costs and weight. Additionally, the plastic films do not provide humidity control after a cigarette package is opened by a customer.

Some cigarette packaging utilizes atomic layer deposition ("ALD") paper coatings to provide a biodegradable polymer coating with or without fillers. The ALD paper coatings assist in controlling the humidity of the cigarette pack. However, the ALD coatings can be prohibitively expensive. Additionally, the ALD coatings do not provide humidity control after a cigarette package is opened by a customer.

Accordingly, it would be desirable to provide a paper material having coatings with improved humidity control characteristics for cigarette packages. In addition, it would be desirable to provide a simpler cigarette package manufacturing process.

SUMMARY

The above and other needs are met by aspects of the present disclosure which, in a first aspect, provides a moisture barrier coated paper material. The paper material includes a base substrate, a first polymer coating, a second polymer coating, and a third polymer coating. The first polymer coating, the second polymer coating, and the third polymer coating provide a barrier for moisture and air exchange through the paper material. The first polymer coating, the second polymer coating, and the third polymer coating also provide heat and pressure sealability capabilities to the paper material.

In second aspect, a package is provided, wherein the package is comprised of the moisture barrier coated paper material described. The package includes a main body formed of a moisture barrier coated paper material. The paper material includes a base substrate, a first polymer coating, a second polymer coating, and a third polymer coating. The first polymer coating, the second polymer coating, and the third polymer coating provide a barrier for moisture and air exchange through the paper material. The first polymer coating, the second polymer coating, and the third polymer coating also provide heat and pressure sealability capabilities to the paper material. The package further includes a top formed of the moisture barrier coated paper material. The top and the main body form a central compartment that is substantially sealed from the ambient environment such that the flow of moisture into or out of the central compartment is inhibited when the top is in a closed position.

In a third aspect, a method for making the package formed of the moisture barrier coated paper material described herein is provided. The method includes forming a moisture barrier coated paper material. The paper material includes a base substrate, a first polymer coating, a second polymer coating, and a third polymer coating. The first polymer coating, the second polymer coating, and the third polymer coating provide a barrier for moisture and air exchange through the paper material. The first polymer coating, the second polymer coating, and the third polymer coating also provide heat and pressure sealability capabilities to the paper material. The method further includes cutting a packaging blank from the paper material. The method includes folding the packaging blank into the package. The method further includes sealing the package by providing heat and pressure to overlapped portions of the paper material.

Further features and advantages of the present disclosure are set forth in more detail in the following description.

BRIEF DESCRIPTION OF THE DRAWINGS

Figure 1:
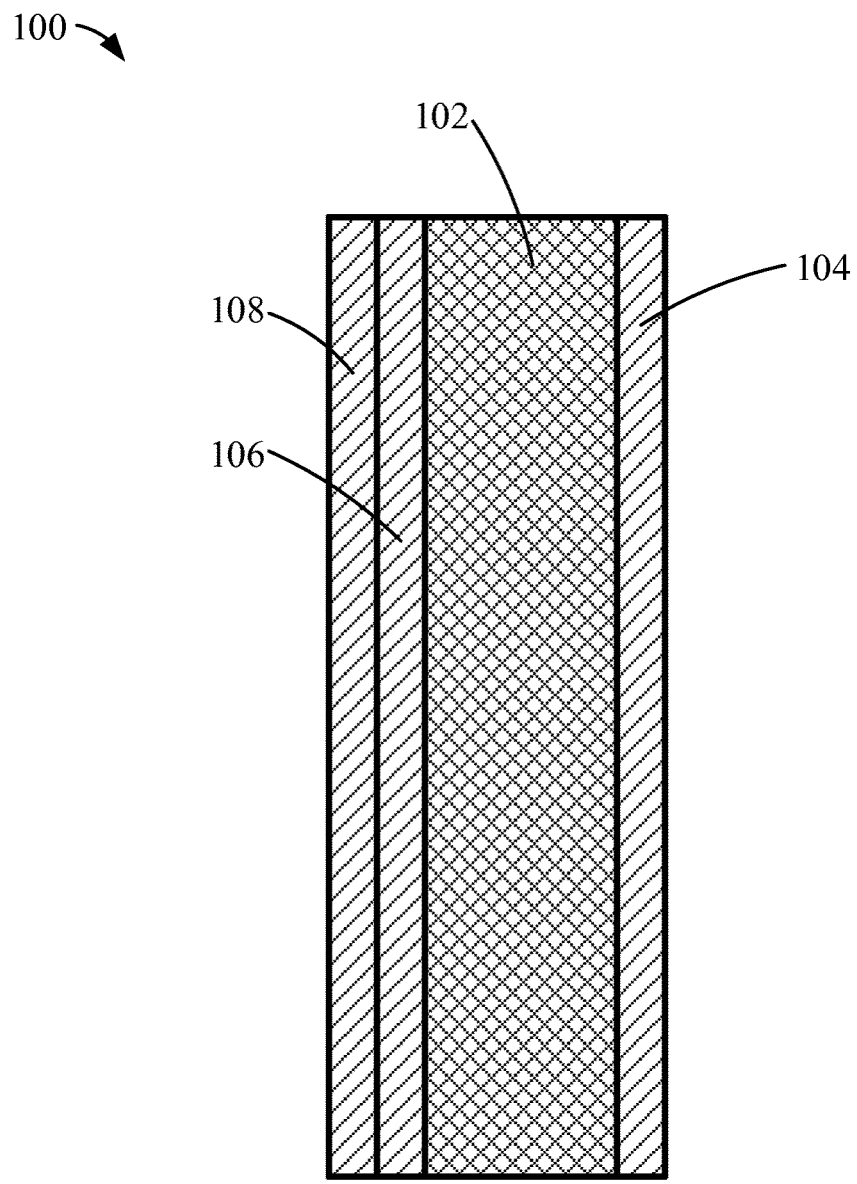
Figure 2:
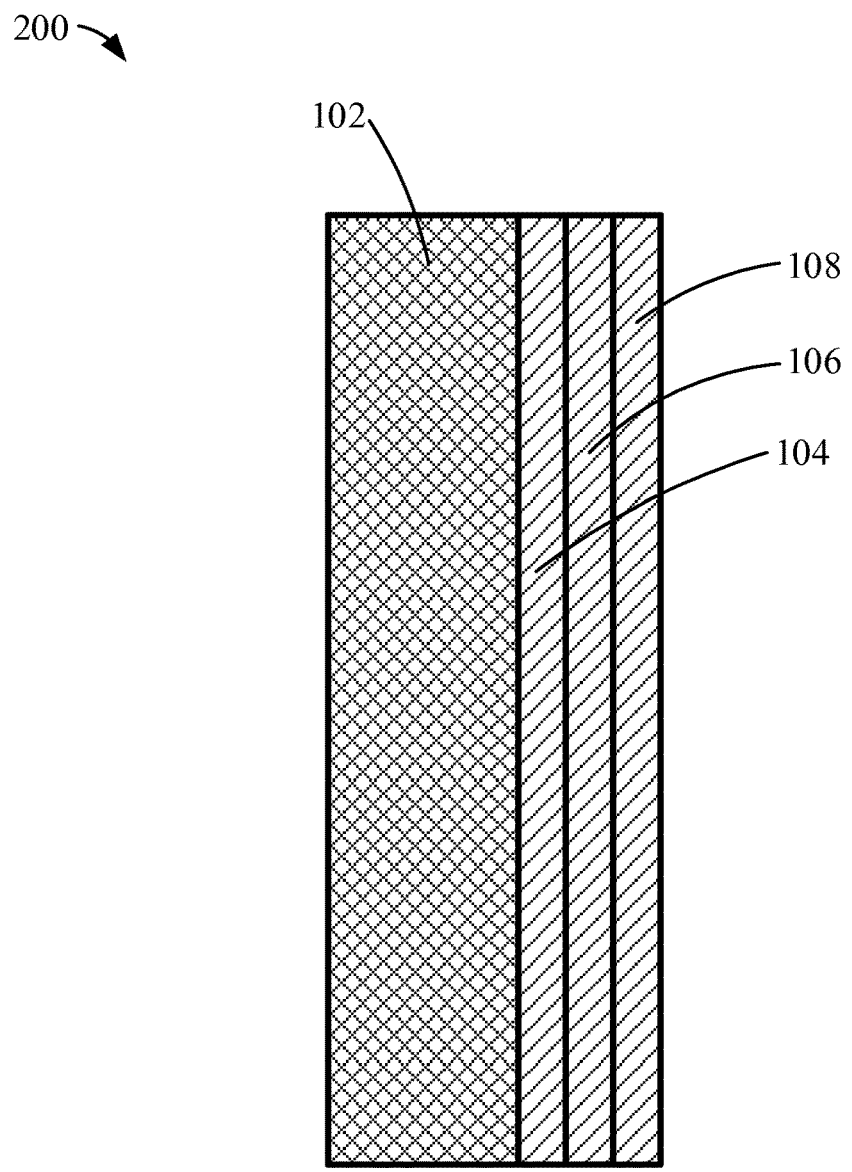
Figure 3:
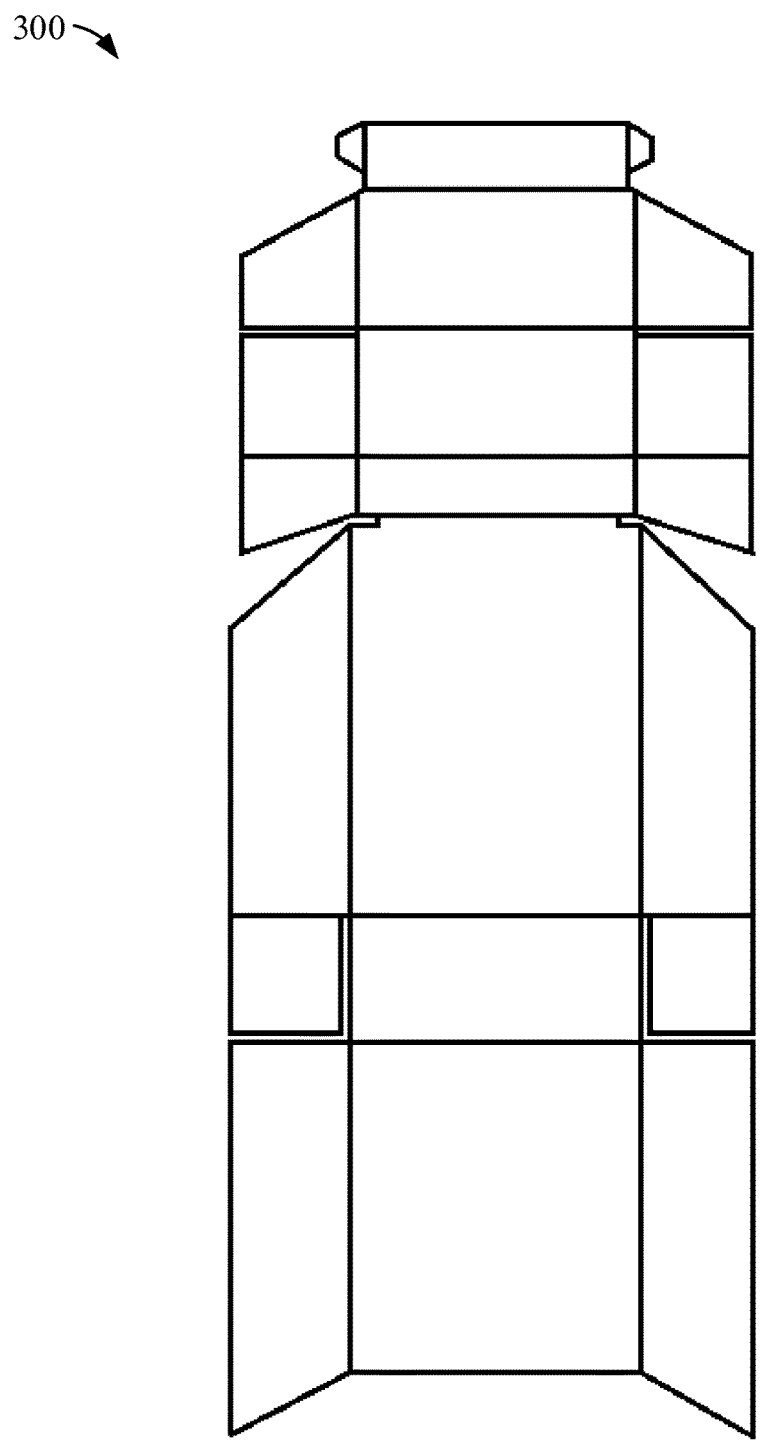
Figure 4:
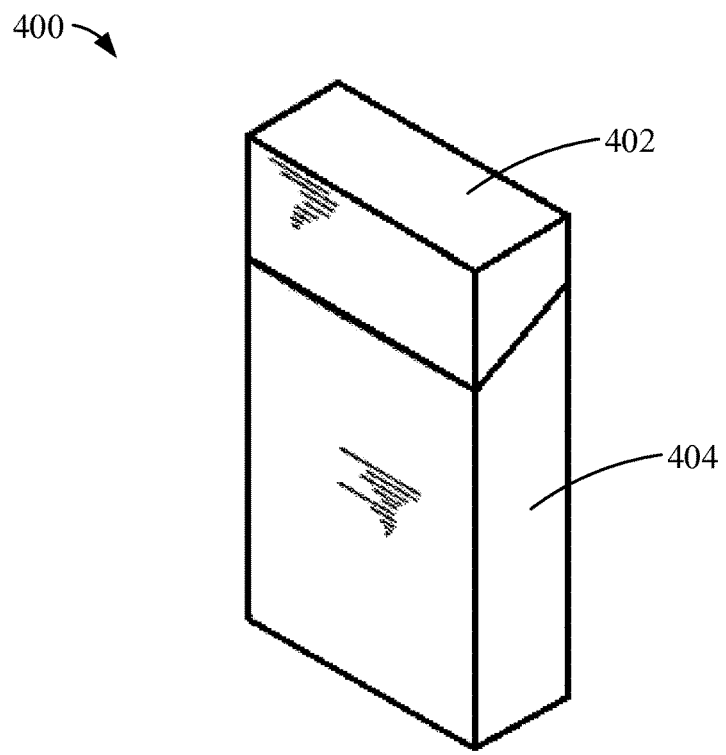
Figure 5:
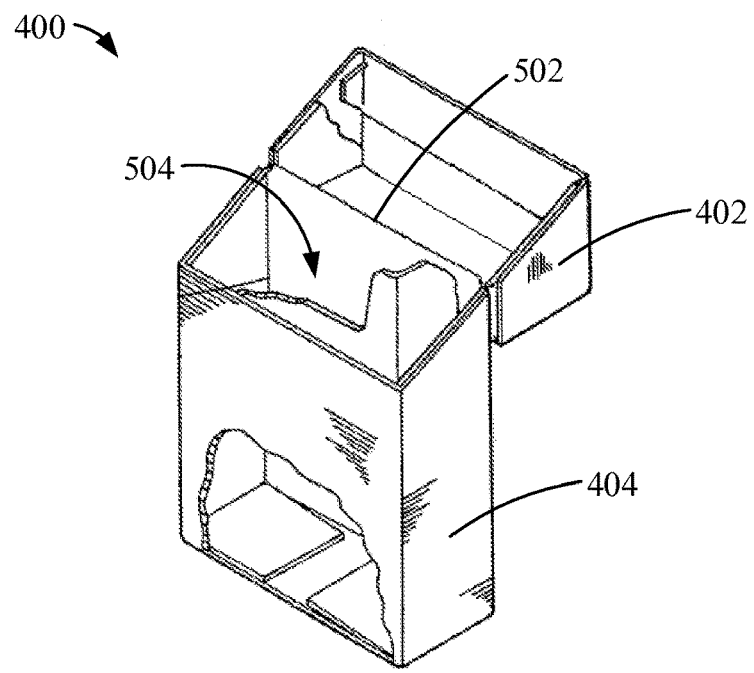

Having thus described the disclosure in general terms, reference will now be made to the accompanying drawings, which are not necessarily drawn to scale, and wherein:

FIG. 1 is a cross-sectional view of a paper material according to an exemplary embodiment;

FIG. 2 is a cross-sectional view of a paper material according to another exemplary embodiment;

FIG. 3 is a view of a packaging blank shown according to an exemplary embodiment;

FIG. 4 is a perspective view of a cigarette pack formed from the packaging blank of FIG. 3;

FIG. 5, is another perspective view of the cigarette pack of FIG. 4; and

Figure 6:
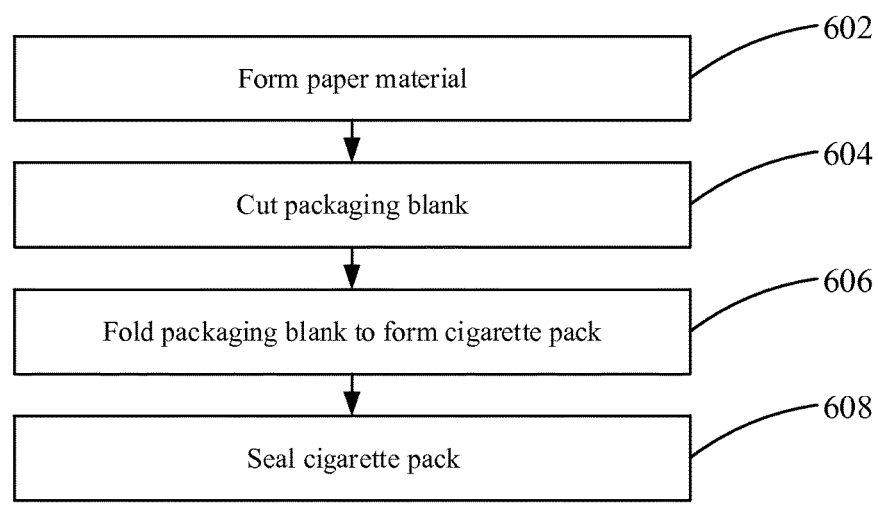

FIG. 6 is a flow diagram of a method of making a cigarette pack out of a moisture barrier coated paperboard according to an exemplary embodiment.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will be thorough and complete, will fully convey the scope of the disclosure to those skilled in the art, and will satisfy applicable legal requirements. Like numbers refer to like elements throughout. As used in this specification and the claims, the singular forms "a," "an," and "the" include plural referents unless the context clearly dictates otherwise.

Moisture Barrier Coated Paperboard

Various embodiments described herein relate to a paper material that includes humidity control coatings. The paper material is a multi-layer material that that has humidity control characteristics. For example, when used to make a sealed package, the paper material inhibits the flow of moisture from the exterior of the sealed package to the interior of the sealed package and vice versa. Additionally, the paper material has heat and pressure sealability characteristics.

Referring to FIG. 1, a cross-sectional view of an exemplary paper material 100 is shown. The paper material 100 includes a base substrate 102. The base substrate 102 is a paper-based substrate. In some embodiments, the paper-based substrate is paperboard. In such arrangements, the paperboard may be solid bleached sulfate paperboard, unbleached paperboard, or recycled paperboard. In some embodiments, the base substrate 102 is a multi-ply paperboard. In other embodiments, the base substrate 102 is a single-ply paperboard. In some embodiments, the base substrate 102 has a thickness of at least 0.25 millimeters. In some arrangements, the base substrate 102 has a weight of 230 grams per square meter ("gsm"). In other arrangements, the base substrate 102 has a reduced weight of about 190 gsm because the later described coatings increase the rigidity of the paper material 100. In some embodiments, the base substrate is reinforced with nanocellulose, which further permits a weight reduction of the paper material 100.

The base substrate 102 includes a first coating 104 on a first side of the base substrate 102. The first coating 104 is a polymer coating applied to the base substrate 102. The polymer coating provides a barrier for moisture and air exchange through the paper material 100. The polymer coating also provides heat and pressure sealability capabilities to the paper material 100. For example, the polymer coating may become tacky when heated to a threshold temperature such that when the polymer coating is heated and pressed against another surface, the polymer coating seals against the surface. The polymer coating has a weight of approximately 30 gsm.

In some embodiments, the polymer coating is a mineral composite extrudate that includes a polymer base with embedded minerals. The polymer base is a thermoplastic material, such as polyester, polyolefin plastomer (a thermoplastic resin polymerized from petroleum-based gases), a polybutylene adipate succinate polymer, a polylactic acid polymer, a polyhydroxyalakonate polymer, a thermoplastic starch, or any other thermoplastic or polymer-containing resin. The embedded mineral material in the polymer base may be any of calcium carbonate, dolomite, talc, silica, silicon, mineral fiber, mica, or the like. The embedded mineral material comprises about 30% to about 65% of the polymer coating. For example, the polymer coating may be any of the polymer coatings described in International Publication Number WO 2014/153073, entitled "COMPOSITE STRUCTURES FOR PACKAGING ARTICLES AND RELATED METHODS," by Smart Planet Technologies, Inc., which is incorporated herein by reference. Accordingly, the first coating 104 is applied to the base substrate 102 via an extrusion coating process that bonds the polymer coating to the base substrate 102. The extrusion coating process utilizes solid polymer base with embedded minerals (e.g., in the form of a powder or a pellet) that is melted and applied to the base substrate 102.

Accordingly, the paper material 100 may be used to create sealed packaging. The paper material 100 can be folded and sealed against itself (e.g., by the provision of heat and pressure to the first coating 104) to form a sealed package. The sealed package formed of the paper material 100 has humidity control properties by preventing moisture from exiting the sealed packaging or entering the sealed packaging. One such exemplary package is described in further detail below.

The base substrate 102 includes a second coating 106 applied to a second side of the base substrate 102. The second side is opposite the first side. The polymer coating provides a barrier for moisture and air exchange through the paper material 100. The polymer coating also provides heat and pressure sealability capabilities to the paper material 100. The polymer coating used for the second coating 106 is selected from the same group of polymer coatings described above with respect to the first coating 104. In some embodiments, the polymer coating is the same polymer coating used for the first coating 104. In other embodiments, the polymer coating is a different polymer coating used for the first coating 104.

In some embodiments, the base substrate 102 includes a third coating 108. The third coating 108 is a polymer coating applied to the second coating 106 (i.e., the third coating 108 is applied over the second coating 106). The polymer coating provides a barrier for moisture and air exchange through the paper material 100. The polymer coating also provides heat and pressure sealability capabilities to the paper material 100. The polymer coating used for the third coating 108 is selected from the same group of polymer coatings described above with respect to the first coating 104. In some embodiments, the polymer coating is the same polymer coating used for the first coating 104 and/or the second coating 106. In other embodiments, the polymer coating is a different polymer coating used for the first coating 104 and/or the second coating 106. In arrangements where the paper material 100 is used to form a package (e.g., as described in further detail below with respect to FIGS. 3-6), an inner compartment of the package can be formed from either the first side or the second side of the base substrate 102.

In some embodiments, at least one of the outermost polymer coating layers (e.g., the first coating 104 or the third coating 108) is post-treated using a corona or plasma treatment that increases the printability of the paper material 100 by increasing the surface energy of the polymer coating to provide improved ink wet-ability and ink adhesion characteristics to the polymer coating. In such arrangements, the paper material 100 can be directly printed on despite the fact that the base substrate 102 is not the outermost layer.

In some embodiments, one of the outermost polymer coating layers (e.g., the first coating 104 or the third coating 108) is a polymer coating designed to provide humidity control capabilities to the paper material 100 instead of or in addition to being designed to provide a moisture barrier as discussed above. In such embodiments, the polymer coating may be a silica gel-impregnated polymer coating or a super absorbent polymer layer that absorbs moisture and releases the absorbed moisture in a controlled manner to provide humidity control capabilities to the paper material 100. In such embodiments, the side of the paper material 100 having the humidity control capabilities can be used to line an inner compartment of a sealed and/or resealable package. Accordingly, the humidity control layer can absorb and release moisture to maintain a desired humidity level within the inner compartment even after the package is opened and closed.

Referring to FIG. 2, a cross-sectional view of an exemplary paper material 200 is shown. The paper material 200 is comprised of the same components as the above described paper material 100. As such, like numbering is used in describing paper materials 100 and 200. The paper material 200 includes the base substrate 102 and the first, second, and third coatings 104, 106, and 108. The paper material 200 differs from the paper material 100 in that all three of the first, second, and third coatings 104 are positioned on the same side of the base substrate 102. That is, the first coating 104 is on a first side of the base substrate 102. The first coating 104 is applied to the base substrate 102. The second coating 106 is applied over the first coating 104 on the first side of the base substrate 102. The third coating 108 is applied over the second coating 106 on the first side of the base substrate 102. The second side of the base substrate 102, which is opposite the first side, remains uncoated and exposed. In some embodiments, the third coating 108, which is the outermost coating, may be a silica gel impregnated layer or a super absorbent polymer layer as described above with respect to the paper material 100.

The first side of the base substrate 102 having the three coatings 104, 106, and 108 forms a barrier for moisture and air exchange through the paper material 200. The three coatings 104, 106, and 108 also provide heat and pressure sealability capabilities to the paper material 200. The second side of the base substrate 102 remains exposed. Unlike the paper material 100, the paper material 200 does not need to have a post-treatment (e.g., corona or plasma treatment) to improve printability of the paper material 200. The base substrate 202, which has a high printability, is exposed on the second side (e.g., the outside of a package formed of the paper material 200).

In some embodiments of paper materials 100 and 200, a hydraulic encapsulation layer of microencapsulated humectants and/or aqueous-based solution may be applied between two polymer coating layers (e.g., between second and third coatings 106 and 108 of paper material 100, between first and second coatings 104 and 106 of paper material 200, or between second and third coatings 106 and 108 of paper material 200). Hydraulic encapsulation ("hydracap") refers to a semi-liquid microencapsulation process. Hydracap is utilized for liquid-in-liquid microencapsulation of components and has structural similarities to liquid foams. Hydracap is capable of encapsulating up to 98% aqueous solution, but retains hydrophobicity due to lipid-like characteristics of the individual wall structure. In this embodiment, a hydracap solution is suspended between a low moisture vapor transmission rate ("MVTR") innermost polymer layer, facing toward the inside of the packaged product, and an outermost polymer layer with a high MVTR. In such embodiments, and when the paper material 100 or 200 is used to form a packaging product (e.g., as described in further detail below), moisture lost from the packaged product passes through the low MVTR barrier and be absorbed by the hydracap layer. As the hydracap absorbs moisture, it releases a proportional amount of its encapsulated humectant or aqueous-based solution phase back through the low MVBR barrier to the packaged product. This creates a humidity control environment within the internal portion of packaging to ensure that all moisture lost from the package contents is replaced by the hydracap layer. The outermost high MVTR barrier seal this internal humidity control mechanism from the external elements.

As described in further detail below, the paper materials 100 and 200 can be used to form packaging products. The resulting packaging products have both moisture barrier characteristics and heat and pressure sealability characteristics.

Cigarette Pack

In various embodiments, the invention described herein relates to a cigarette pack made of the above-described moisture barrier coated paper materials 100 and 200. For example, the above-described paper-materials 100 and 200 can be used to create various different prior art cigarette packages, such as those described in U.S. Pat. No. 4,852,734 to Allen et al.; U.S. Pat. No. 8,522,515 to Carter et al.; U.S. Pat. No. 8,118,161 to Guerrera et al.; U.S. Pat. No. 7,823,731 to Wu; U.S. Pat. No. 7,228,961 to Koetter et al.; U.S. Pat. No. 7,048,115 to Stringfield; U.S. Pat. No. 7,014,039 to Henson et al.; U.S. Pat. No. 6,364,106 to Fagg et al.; U.S. Pat. No. 5,379,889 to Cobler et al.; U.S. Pat. No. 5,248,031 to Burrows et al.; U.S. Pat. No. 5,139,140 to Burrows et al.; and U.S. Pat. No. 4,807,745 to Langley et al.

Referring to FIG. 3, a view of a packaging blank 300 is shown according to an exemplary embodiment. The packaging blank 300 is formed from a paper material. The paper material used for the packaging blank is the paper material 100 or the paper material 200, which are each described in further detail above. The packaging blank 300, for example, may be cut from a roll or sheet of the paper material. The packaging blank 300 can be folded along the crease lines and sealed by glue and/or by activating the heat and pressure sealing characteristics of the paper material to form a cigarette pack 400.

FIG. 4 shows a perspective view of the formed cigarette pack 400. The cigarette pack 400 includes a top lid 402 and a main body 404. As shown in FIG. 5, the top lid 402 can be rotated away from the main body 404 along a hinge 502 formed from a crease in the paper material. When the top lid 402 is rotated away from the main body 404, a central compartment 504 is revealed. The central compartment 504 is sized and shaped to store cigarettes in any of the manners described in the above-incorporated patent references. When the top lid 402 is closed (e.g., as shown in FIG. 4), the central compartment 504 is substantially sealed from the ambient environment. Accordingly, when the top lid 402 is closed, the polymer coated paper material inhibits the flow of moisture into or out of the central compartment 504.

In embodiments in which the paper material used to form the cigarette pack 400 includes an outermost polymer coating layer having the aforementioned humidity control functionality, that outermost polymer coating layer is used to line the central compartment 504. Although the humidity levels within the central compartment 504 may be initial set by a manufacturer of the cigarette pack 400, once the top lid 402 is opened by a user, the humidity within the central compartment 504 will fluctuate depending on the humidity levels of the ambient environment. Since the polymer coating used to line the central compartment 504 is configured to absorb and release moisture, when the top lid 402 is closed by the user, the central compartment 504 is substantially sealed and the humidity control polymer coating layer can normalize the humidity within the central compartment 504. That is, the humidity control polymer coating later can either (1) absorb excess moisture from the central compartment 504 if the central compartment 504 is too humid, or (2) release stored moisture into the central compartment 504 if the central compartment 504 is too dry.

Method for Making the Moisture Barrier Coated Paperboard and the Cigarette Pack

In various embodiments, the invention described herein relates to a method of making a cigarette pack (e.g., cigarette pack 400 as shown in FIG. 4) out of the above-described moisture barrier coated paper materials 100 and 200.

Referring to FIG. 6, a flow diagram of a method 600 of making a cigarette pack out of a moisture barrier coated paperboard is shown according to an exemplary embodiment. Method 600 begins when the paper material used to create the cigarette pack is formed at 602. In some embodiments, the paper material used to create the cigarette pack is either the paper material 100 or the paper material 200. In such embodiments, the paper material is formed by coating a base paperboard substrate with at least one polymer coating. The polymer coating provides heat and pressure sealability to the paper material. Additionally, the polymer coating provides a barrier for moisture and air exchange through the paper material. The polymer coating may be applied to the base substrate through an extrusion coating process as described above with respect to paper materials 100 and 200.

In some embodiments, multiple layers of the polymer coating are applied. For example, three layers of the polymer coating may be applied such that all three layers are on the same side of the base substrate (e.g., as described above with respect to the paper material 200). As an additional example, three layers of the polymer coating may be applied such that two of the layers are on one side of the base substrate and the third layer is on the opposite side of the base substrate (e.g., as described above with respect to the paper material 100).

In some embodiments, one of the outermost polymer coating layers is a polymer coating designed to provide humidity control capabilities to the paper material instead of or in addition to being designed to provide a moisture barrier as discussed above. In such embodiments, the polymer coating may be a silica gel-impregnated polymer coating or a super absorbent polymer layer that absorbs moisture and releases the absorbed moisture in a controlled manner to provide humidity control capabilities to the paper material.

In some embodiments, the paper material is post-treated using a corona or plasma treatment. The corona or plasma treatment increases the printability of the paper material by increasing the surface energy of the polymer coating to provide improved ink wet-ability and ink adhesion characteristics to the polymer coating.

The paper material may formed into sheets for storage and further processing. In other embodiments, the paper material is rolled onto a core for storage and further processing.

A packaging blank is cut from the paper material at 604. The packaging blank may, for example, be the packaging blank 300 described above with respect to FIG. 3. The packaging blank can be folded along the crease lines and sealed by glue and/or by activating the heat and pressure sealing characteristics of the paper material to form a cigarette pack 400.

The packaging blank is folded to form the cigarette pack at 606. The cigarette pack may, for example, be the cigarette pack 400 described above with respect to FIGS. 4 and 5. The packaging blank formed at 604 is folded along the crease lines into the shape of the cigarette pack.

The cigarette pack is sealed at 608. The cigarette pack is sealed by applying heat and pressure to the overlapped portions of the paper material. The heat and pressure sealability characteristics of the paper material allow the cigarette pack to be formed without the use of additional adhesive. In some embodiments, an adhesive (e.g., hot melt glue) is used to provide additional integrity to the sealed portions of the cigarette pack.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

That which is claimed:

1. A moisture barrier coated paper material, comprising:
   a base substrate comprising a paper-based substrate;
   a first polymer coating, a second polymer coating, a third polymer coating, and a hydraulic encapsulation layer of microencapsulated humectants or a microencapsulated aqueous-based solution between the second polymer coating and the third polymer coating, the first polymer coating, the second polymer coating, and the third polymer coating providing a barrier for moisture and air exchange through the paper material, the first polymer coating, the second polymer coating, and the third polymer coating providing heat and pressure sealability capabilities to the paper material,
   wherein the first polymer coating is on a first side of the base substrate, the second polymer coating is on a second side of the base substrate, the second side is opposite the first side, and the third polymer coating is applied over the second polymer coating.

2. The paper material of claim 1, wherein each of the first polymer coating, the second polymer coating, and the third polymer coatings are mineral composite extrudates that include a polymer base with embedded minerals.

3. The paper material of claim 2, wherein the polymer base is a polyolefin plastomer, a polybutylene adipate succinate polymer, a polylactic acid polymer, a polyhydroxyalakonate polymer, or a thermoplastic starch.

4. The paper material of claim 2, wherein the embedded minerals comprises one of calcium carbonate, dolomite, talc, silica, silicon, mineral fiber, or mica.

5. The paper material of claim 1, wherein the base substrate is reinforced with nanocellulose.

6. The paper material of claim 1, wherein the first polymer coating or the third polymer coating is post-treated using a corona or a plasma treatment to increase a printability of the paper material by increasing a surface energy of either the first polymer coating or the third polymer coating to provide improved ink wet-ability and ink adhesion characteristics.

7. A package comprising:
   a main body formed of a moisture barrier coated paper material including a base substrate, a first polymer coating, a second polymer coating, a third polymer coating, and a hydraulic encapsulation layer of microencapsulated humectants or a microencapsulated aqueous-based solution between the second polymer coating and the third polymer coating, the first polymer coating is on a first side of the base substrate, the second polymer coating is on a second side of the base substrate, the second side is opposite the first side, and the third polymer coating is applied over the second polymer coating, the first polymer coating, the second polymer coating, and the third polymer coating providing a barrier for moisture and air exchange through the paper material, the first polymer coating, the second polymer coating, and the third polymer coating providing heat and pressure sealability capabilities to the paper material;

a top formed of the moisture barrier coated paper material, a central compartment formed by the top and the main body, the central compartment substantially sealed from the ambient environment such that the flow of moisture into or out of the central compartment is inhibited when the top is in a closed position.

8. The package of claim 7, wherein the top is connected to the main body through a hinge formed from a crease in the paper material.

9. The package of claim 7, wherein each of the first polymer coating, the second polymer coating, and the third polymer coatings are mineral composite extrudates that include a polymer base with embedded minerals.

10. The package of claim 9, wherein the polymer base is a polyolefin plastomer, a polybutylene adipate succinate polymer, a polylactic acid polymer, a polyhydroxyalakonate polymer, or a thermoplastic starch.

11. The package of claim 9, wherein the embedded minerals may be any of calcium carbonate, dolomite, talc, silica, silicon, mineral fiber, or mica.

12. The package of claim 7, wherein the base substrate is reinforced with nanocellulose.

13. The package of claim 7, wherein the central compartment is formed by the first side of the base substrate.

14. The package of claim 7, wherein the central compartment is formed by the second side of the base substrate.

15. The package of claim 7, wherein the outermost polymer coating layer of the first polymer coating or the third polymer coating is post-treated using a corona or a plasma treatment to increase a printability of the paper material by increasing a surface energy of either the first polymer coating or the third polymer coating to provide improved ink wet-ability and ink adhesion characteristics.

16. The package of claim 7, wherein the package is a cigarette pack.

17. A method of making a package comprising:

forming a moisture barrier coated paper material that includes a moisture barrier coated paper material including a base substrate, a first polymer coating, a second polymer coating, a third polymer coating, and a hydraulic encapsulation layer of microencapsulated humectants or a microencapsulated aqueous-based solution between the second polymer coating and the third polymer coating, the first polymer coating is on a first side of the base substrate, the second polymer coating is on a second side of the base substrate, the second side is opposite the first side, and the third polymer coating is applied over the second polymer coating, the first polymer coating, the second polymer coating, and the third polymer coating providing a barrier for moisture and air exchange through the paper material, the first polymer coating, the second polymer coating, and the third polymer coating providing heat and pressure sealability capabilities to the paper material;

cutting a packaging blank from the paper material;

folding the packaging blank into the package; and sealing the package by providing heat and pressure to overlapped portions of the paper material.

18. The method of claim 17, further comprising post-treating the paper material with a corona or plasma treatment.

19. The method of claim 17, wherein the package includes a top and a main body that form a central compartment.

20. The method of claim 19, further comprising forming a hinge between the top and the main body out of the paper material.

21. The method of claim 20, wherein the package is a cigarette pack.

22. The method of claim 17, wherein sealing the package does not include applying adhesive.

* * * * *